US012691376B2

(12) United States Patent
Sundaram et al.

(10) Patent No.: US 12,691,376 B2
(45) Date of Patent: Jul. 28, 2026

(54) MODALITY-EXPANDING GAMING EXPERIENCE

(71) Applicant: SONY INTERACTIVE ENTERTAINMENT LLC, San Mateo, CA (US)

(72) Inventors: Chockalingam Ravi Sundaram, Belmont, CA (US); Lakshmish Kaushik, San Jose, CA (US); Ayush Raina, Foster City, CA (US); Kusha Sridhar, Foster City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 174 days.

(21) Appl. No.: 18/235,676

(22) Filed: Aug. 18, 2023

(65) Prior Publication Data

US 2025/0058214 A1 Feb. 20, 2025

(51) Int. Cl.
| | |
|---|---|
| *A63F 13/28* | (2014.01) |
| *A63F 13/67* | (2014.01) |
| *A63F 13/79* | (2014.01) |

(52) U.S. Cl.
CPC .............. *A63F 13/28* (2014.09); *A63F 13/67* (2014.09); *A63F 13/79* (2014.09)

(58) Field of Classification Search
None
See application file for complete search history.

(56) References Cited

U.S. PATENT DOCUMENTS

| | | | | |
|---|---|---|---|---|
| 2004/0267683 A1* | 12/2004 | Herbrich | ................. | A63F 13/58 |
| | | | | 706/56 |
| 2014/0142762 A1* | 5/2014 | Li | ........................... | H04N 21/81 |
| | | | | 700/275 |
| 2015/0278263 A1* | 10/2015 | Bowles | ................. | A63F 13/212 |
| | | | | 463/43 |
| 2016/0121218 A1* | 5/2016 | Allen | .................... | A63F 13/822 |
| | | | | 463/31 |

(Continued)

OTHER PUBLICATIONS

"International Search Report and Written Opinion", issued by the United States Patent and Trademark Office, as International Searching Authority for PCT Application No. PCT/US2024/041446 on Nov. 14, 2024, 10 pages.

(Continued)

*Primary Examiner* — Jason T Yen
(74) *Attorney, Agent, or Firm* — Kilpatrick Townsend & Stockton LLP

(57) ABSTRACT
Systems and methods are disclosed for expanding the output modalities of a gameplay session. Gameplay input data, such as audio data, video data, haptics data, and Gameplay context data, can be processed using machine learning (ML) models to generate output state vectors, which can be used to drive state changes in remote devices, such as smarthome devices (e.g., smart lightbulbs, smart light switches, smart fans, smart thermostats, smart blinds, smart speakers, etc.). To generate the output state vectors, first gameplay features are extracted from the gameplay input data, then the gameplay features are processed by a state vector generation model to generate the state vectors. Each modality of gameplay input data can be processed by a corresponding feature extractor. Gameplay sessions can be evaluated to train the ML models.

25 Claims, 9 Drawing Sheets

(56)            References Cited

U.S. PATENT DOCUMENTS

| 2016/0261425 A1* | 9/2016 | Horton ................. H04L 67/535 |
| 2017/0106283 A1* | 4/2017 | Malyuk ................... A63F 13/49 |
| 2018/0154253 A1* | 6/2018 | Peterson ............ H04L 65/1083 |
| 2018/0236354 A1* | 8/2018 | Van Boven ............. A63F 13/40 |
| 2022/0067385 A1 | 3/2022 | Kaushik et al. |
| 2023/0233940 A1* | 7/2023 | van Welzen .......... A63F 13/655 |
| | | 463/31 |
| 2023/0277944 A1* | 9/2023 | Yerva ..................... A63F 13/35 |
| | | 463/31 |
| 2023/0377279 A1* | 11/2023 | Varis Doggett ......... A63F 13/65 |

OTHER PUBLICATIONS

PCT/US2024/041446, "International Preliminary Report on Patentability", Mar. 5, 2026, 9 pages.

* cited by examiner

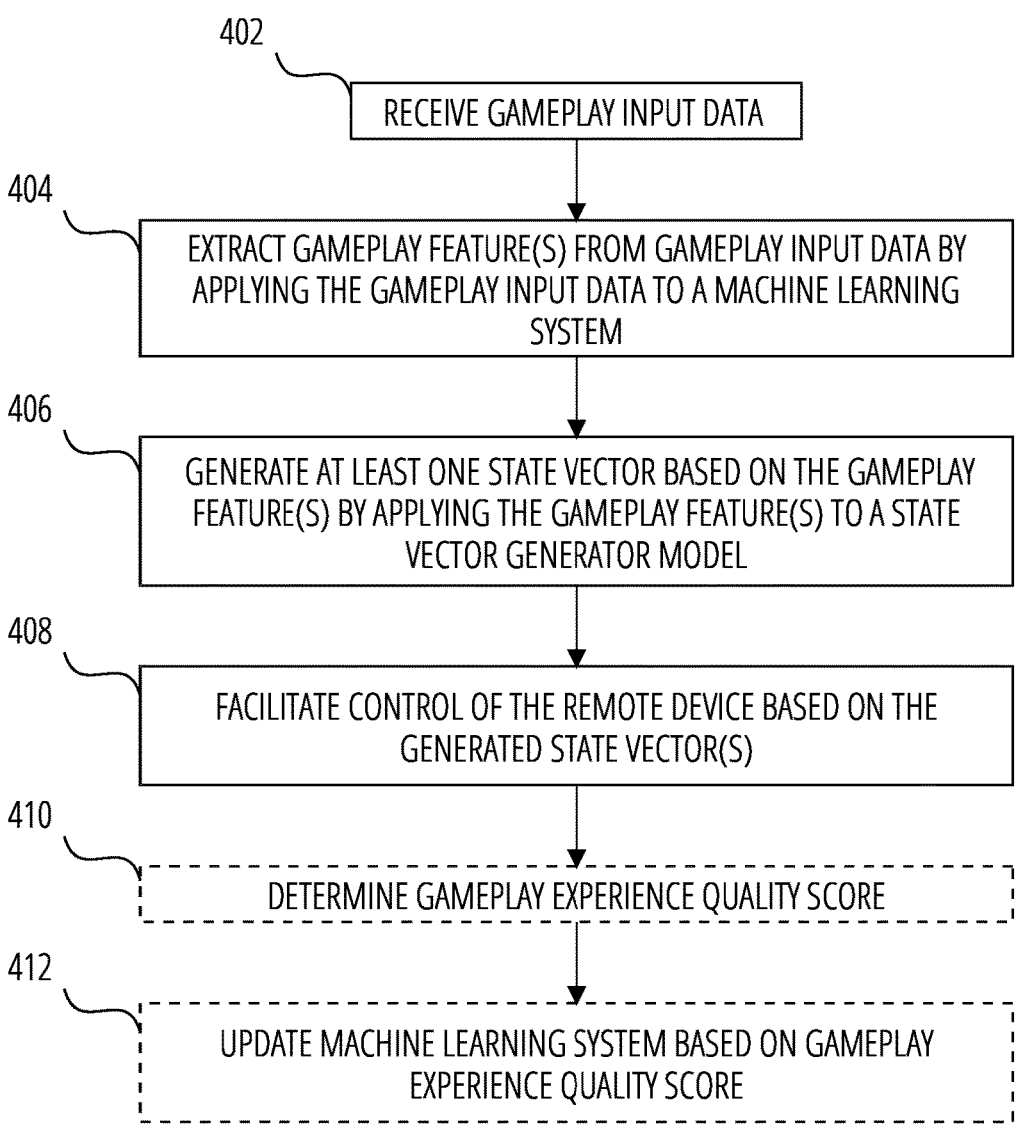

402

RECEIVE GAMEPLAY INPUT DATA

404

EXTRACT GAMEPLAY FEATURE(S) FROM GAMEPLAY INPUT DATA BY APPLYING THE GAMEPLAY INPUT DATA TO A MACHINE LEARNING SYSTEM

406

GENERATE AT LEAST ONE STATE VECTOR BASED ON THE GAMEPLAY FEATURE(S) BY APPLYING THE GAMEPLAY FEATURE(S) TO A STATE VECTOR GENERATOR MODEL

408

FACILITATE CONTROL OF THE REMOTE DEVICE BASED ON THE GENERATED STATE VECTOR(S)

410

DETERMINE GAMEPLAY EXPERIENCE QUALITY SCORE

412

UPDATE MACHINE LEARNING SYSTEM BASED ON GAMEPLAY EXPERIENCE QUALITY SCORE

FIG. 4

602 IDENTIFY REMOTE DEVICE(S)

610 IDENTIFY REMOTE DEVICE LATENCY

604 RECEIVE GAMEPLAY INPUT DATA

606 DETERMINE ONE OR MORE FUTURE STATE VECTORS

608 EFFECT CONTROL OF REMOTE DEVICE USING THE ONE OR MORE FUTURE STATE VECTORS

600

MODALITY-EXPANDING GAMING EXPERIENCE

The present disclosure relates to remotely controlled home devices generally and more specifically to synchronizing such devices to gameplay.

BACKGROUND

New and immersive gaming experiences are often sought out by users (e.g., gamers), and can play an extremely important role in increasing user enjoyment, promoting sales, and driving further innovation and development. The evolution of virtual reality (VR) and augmented reality (AR) gaming experiences has created new opportunities for game developers to engage their audience. While these technologies are useful for some users, they may rely on technology (e.g., a VR headset) that other users may not have or may not wish to use. Many users play game at their home, which often makes use of televisions, computer screens, and accompanying speakers.

There is a need for new and immersive gaming experiences.

BRIEF SUMMARY

In one aspect, a method, includes receiving gameplay input data associated with a user engaging in a gameplay session in an environment. The method also includes processing the gameplay input data by a machine learning system to generate one or more state vectors, where processing the gameplay input data by the machine learning system includes extracting one or more gameplay features from the gameplay input data, and generating the one or more state vectors based on the one or more gameplay features. The method also includes facilitating a state change in one or more remote devices based at least in part on the one or more state vectors, the state change being perceivable in the environment.

The method may also include where the gameplay input data includes i) gameplay audio data; ii) Gameplay video data; iii) Gameplay haptics data; iv) Gameplay context data; or v) any combination of i-iv.

The method may also include where extracting the one or more gameplay features includes applying the gameplay input data to one or more feature extractors, each of the one or more feature extractors being a machine learning model trained according to a unique input modality.

The method may also include where the gameplay input data includes a plurality of gameplay data streams, each of the plurality of gameplay data streams being associated with a different one of a plurality of input modalities, the one or more feature extractors including a plurality of feature extractors, each of the plurality of feature extractors being associated with a different one of the plurality of input modalities, and where extracting the one or more gameplay features from the gameplay input data includes applying each of the plurality of gameplay data streams to a respective one of the plurality of feature extractors according to that gameplay data stream's respective input modality.

The method may also include where generating the at least one state vector based on the one or more gameplay features includes applying the one or more gameplay features to a state vector generation model.

The method may also include where the state vector generation model is a probabilistic generative model.

The method may also include where applying the one or more gameplay features to the state vector generation model includes applying a weighting value for each of the one or more gameplay features, and determining the one or more state vectors based at least in part on the one or more weighted gameplay features.

The method may also include further includes determining a gameplay experience quality score associated with the gameplay session, and adjusting the one or more weighting values based at least in part on the gameplay experience quality score to improve the gameplay experience quality score.

The method may also include where determining the gameplay experience quality score includes receiving user feedback associated with the gameplay session, and processing the user feedback to determine the gameplay experience quality score.

The method may also include where the state vector generation model is pretrained according to a baseline model, the method further includes receiving user feedback associated with the gameplay session, and updating the state vector generation model based at least in part on the user feedback.

The method may also include further includes determining a set of changeable states associated with the one or more available remote devices, where generating the at least one state vector includes generating, for each of the set of changeable states, a corresponding state vector.

The method may also include where facilitating the state change includes transmitting a command signal via a wired connection or a wireless connection, the command signal usable to alter a state of at least one of the one or more remote devices.

The method may also include further includes determining, for each of the one or more remote devices, a latency value, where processing the gameplay input data to generate the one or more state vectors is further based at least in part on the latency values, such that corresponding latency is compensated for when facilitating the state change of each of the one or more remote devices.

The method may also include where extracting the one or more gameplay features from the gameplay input data includes predicting values for at least one of the one or more gameplay features up to a future time equal to a current time plus a largest latency value of the one or more latency values, where generating the one or more state vectors is based at least in part on the one or more latency values such that for a given one of the one or more remote devices, the respective generated state vector accounts for the respective latency value.

The method may also include where processing the gameplay input data to generate the one or more state vectors occurs on a server that is communicatively coupled to a gaming device being used by a user to engage in the gameplay session, and where facilitating the state change includes transmitting the one or more state vectors to the gaming device.

The method may also include where facilitating the state change includes transmitting, from the gaming device, a command signal via a wired connection or a wireless connection, the command signal usable to alter a state of at least one of the one or more remote devices.

The method may also include where the one or more state vectors includes a plurality of state vectors across a plurality of output modalities including at least a first output modality and a second output modality, where the plurality of state vectors, when received by the gaming device, are processed to excluded each of the plurality of state vectors associated with the first output modality.

The method may also include further includes receiving output modality capability information indicative of a set of one or more output modalities capable of being engaged in association with the environment, where generating the one or more state vectors is based at least in part on the output modality capability information such that each of the one or more state vectors is associated with one of the set of one or more output modalities.

The method may also include further includes receiving gameplay output modality state data associated with the user engaging in the gameplay session, the gameplay output modality state data indicative of one or more desired states associated with one or more possible output modalities and associated with the gameplay session, where facilitating the state change is further based at least in part on the gameplay output modality state data.

The method may also include further includes determining relative position information for each of the one or more remote devices, the relative position information indicative of a relative position with respect to an expected location of the user, where processing the gameplay input data to generate the one or more state vectors is further based at least in part on the relative position information.

The method may also include where the one or more remote devices includes i) a light source; ii) a fan; iii) a thermostat; iv) a window blinds controller; v) a speaker, the speaker not directly outputting the gameplay audio data; vi) a switch; vii) a dimmer; or viii) any combination of i-vii.

The method may also include where facilitating the state change includes employing an application programming interface associated with at least one of the one or more remote devices.

In one aspect, a system comprises a control system including one or more processors; and a memory having stored thereon machine readable instructions; wherein the control system is coupled to the memory, and any one of the aforementioned methods is implemented when the machine executable instructions in the memory are executed by at least one of the one or more processors of the control system.

In one aspect, a system for expanding gameplay output modalities includes a control system configured to implement any one of the aforementioned methods.

In one aspect, a computer program product comprises instructions which, when executed by a computer, cause the computer to carry out any one of the aforementioned methods. In some cases, the computer program product is a non-transitory computer readable medium.

Other technical features may be readily apparent to one skilled in the art from the following figures, descriptions, and claims.

BRIEF DESCRIPTION OF THE DRAWINGS

FIG. 4 is a flowchart depicting a process for synchronizing gameplay with remote devices, according to certain aspects of the present disclosure.

DETAILED DESCRIPTION

Figure 1:
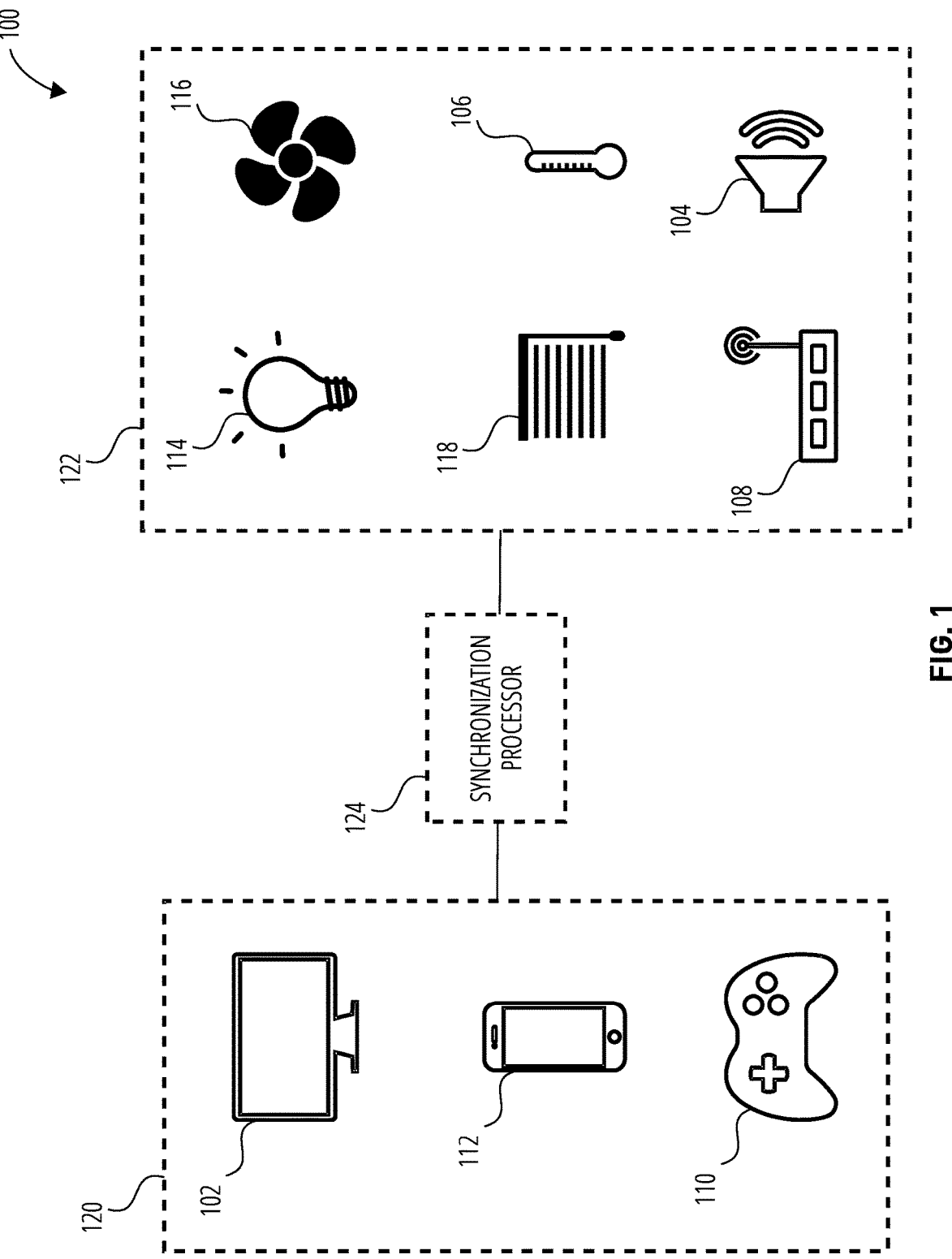
FIG. 1 is a schematic diagram of a system for gameplay synchronization, according to certain aspects of the present disclosure.

Certain aspects and features of the present disclosure relate to systems and methods for expanding the output modalities of a gameplay session. Gameplay input data, such as audio data, video data, haptics data, and Gameplay context data, can be processed using machine learning (ML) models to generate output state vectors, which can be used to drive state changes in remote devices, such as smarthome devices (e.g., smart lightbulbs, smart light switches, smart fans, smart thermostats, smart blinds, smart speakers (e.g., digital personal assistants or other smart speaker products), etc.). To generate the output state vectors, first gameplay features are extracted from the gameplay input data, then the gameplay features are processed by a state vector generation model to generate the state vectors. Each modality of gameplay input data can be processed by a corresponding feature extractor. Gameplay sessions can be evaluated to train the ML models.

Certain aspects and features of the present disclosure are especially useful to improve the gameplay experience of video games or any games that involve the use of a display device (e.g., a computer monitor, a television, a screen of a portable device, or the like). These games can be played using any suitable hardware, such as a personal computer, a smartphone, a portable console, or a console device. In some cases, a combination of hardware can be used. The individual hardware or combination of hardware used to play or otherwise engage with a game can be known as a gaming device.

A gaming session can be any period of time in which a user is engaging with a gaming device. The gaming session can commence when the user beings using the gaming device, when the user opens the desired game on the gaming device, or when the user starts actively playing the game (e.g., after pressing "start" on a start screen of the game). The gaming session can conclude when the user stops actively playing the game, closes the game on the gaming device, or shuts down or otherwise ceases to use the gaming device. In some cases, a gaming session can include breaks between its commencement and conclusion.

Certain aspects and features of the present disclosure are described with reference to a user (e.g., gamer) engaging in a gaming session. Often, this user engaging in the gaming session will be an individual actively participating in or otherwise playing the game. In some cases, however, a user engaging in a gaming session can include an individual viewing another individual playing a game, whether or not in the same environment.

As used herein, the term Environment is intended to refer to any location in which a user is engaging in a gaming session, such as a region of a room, a room, a set of rooms, a floor of a building, a home, a region of land, and the like. In some cases, an environment can be made up of multiple sub-environments (e.g., a floor comprising multiple rooms). In some cases, a gaming session can itself be associated with multiple environments, such as a first environment in which a first user is playing the game and a second environment in which a second user is viewing the first user playing the game (e.g., via a streaming service). In some cases, a gaming session can move between multiple environments. Certain aspects and features of the present disclosure can automatically detect in which environment the gaming session is occurring (e.g., via detect the user's location or detecting the gaming device being used, such as a console device in a first room as compared to a console device in a second room), and switch from controlling remote devices in the first environment to controlling remote devices in the second environment.

Certain aspects and features of the present disclosure involve a machine learning system generating state vector(s) from gameplay input data. Gameplay input data is a collection of data coming from the game being played. The gameplay input data can relate to multiple modalities, such as i) audio data; ii) video data; iii) haptics data; and iv) Gameplay context data.

Gameplay audio data is data that relates to audio to be generated and presented to the user while engaging in the game. Gameplay audio data can take any suitable form such as a description of sound effects, a raw audio waveform, compressed audio content, and the like. In some cases, the gameplay audio data is simply the raw audio output from the game across any suitable number of channels (e.g., monaural, stereo, surround, etc.). In some cases, the gameplay audio data includes more complex information, such as individual audio tracks (e.g., background audio, character voicing, object effects) that are otherwise mixed together to create the raw audio output from the game.

Gameplay video data is data that relates to video or visuals (e.g., still images) to be generated and presented to the user while engaging in the game. Gameplay video data can take any suitable form such as a description of visual elements, a still image, a collection of still images, a video file, and the like. In some cases, the Gameplay video data is simply the raw video output from the game (e.g., the video output that is presented on a display device while the user engages in the game). In some cases, the Gameplay video data includes more complex information, such as video information outside of the current field of view being displayed to the user (e.g., pre-rendered video content of portions of a room outside of the playable game character's field of view).

Gameplay haptics data is data that relates to tactile or haptic feedback to be generated and presented to the user (e.g., via a haptic motor, haptic actuator, electrical stimulus, etc.) while engaging in the game. Gameplay haptics data can take any suitable form, such as a binary signal of when haptic feedback should be provided, a description of what haptic feedback to provide, a signal of how haptic feedback should be provided (e.g., a signal controlling the attack, intensity, and decay of a haptic effect), a collection of signals relating to multiple haptic feedback devices, and the like. In some cases, the gameplay haptic data is simply the raw signals output from the game to be used by a haptic feedback device (e.g., the signals that are output to driver of a haptic feedback device while the user engages in the game). In some cases, the gameplay haptic data includes more complex information.

Gameplay context data is data that relates to contextual elements of the gameplay while the user is engaging in the game. These contextual elements can be based on the type of game itself and whether or not the game developer provided additional information (e.g., metadata) that can be leveraged as contextual elements. Gameplay context data can be information about a game state, such as from an application programming interface (API) of a game engine. For example, a traditional platformer game may include contextual elements such as i) the current level or stage being played; ii) the current character selected for play; iii) the language selected for gameplay; iv) the number of collectables (e.g., coins, stars, points, etc.) obtained by the player; v) a stage of progression of the game (e.g., whether or not certain storyline elements have yet occurred for the player); and others. While described herein as a single modality, in some cases gameplay context data can itself be subdivided into additional sub-modalities (e.g., gameplay context data related to overall game progress and gameplay context data related to the current actions being taken by the player). As described in further detail herein, in some cases the gameplay context data is processed by a context feature extractor to extract gameplay features. In some cases, each sub-modality of the gameplay context data is processed by a unique context feature extractor associated with that sub-modality (e.g., trained for that sub-modality).

Gameplay input data is processed by one or more feature extractors to obtain gameplay features. Gameplay features can by any suitable feature that can be extracted from the gameplay input data, whether readily discernable to a human (e.g., a discernable feature such as a listing of objects depicted in a scene) or not practically discernable to a human (e.g., the spectral centroid of an audio signal). In some cases the gameplay features that are extracted include at least one feature that is not practically discernable to a human.

While any number of feature extractors can be used, in some cases each modality of gameplay input data (e.g., each input modality) is associated with its own feature extractor, which is trained on gameplay input data of that modality. For example, gameplay audio data is processed by an audio feature extractor, while gameplay context data is processed by a context feature extractor.

The gameplay features that are determined can relate to the different input modalities. For example, audio-related features can be determined, such as the spectral centroid of the incoming audio signal; video-related features can be determined, such as a listing of visual objects in a scene, spectral information about the entire scene spectrum, and the like; haptics-related features can be determined, such as vibration patterns, spectral information about vibrations, and other haptic events; and context-related features can be determined, which can depend on the context provided (e.g., a game progress feature indicating the player's progress in the game, such as based on the current stage or level, based on the number of coins, trophies, or other collectables collected in the game, or based on other aspects).

The gameplay features can be provided as input to a state vector generation model. The state vector generation model can take these gameplay features and output a set of one or more state vectors. In some cases, the state vector generation model can apply weightings to each of the gameplay features, which can be adjusted and modified as necessary during initial training (e.g., training to create a baseline model for initial use by all users) or subsequent training (e.g., personalized training to update a model according to a user's personal preferences or experience). The state vector generation model can be a generative model (e.g., a probabilistic generative model), such that the state vector generation model does not necessarily output the same set of one or more state vectors when processing the same gameplay features on different occasions.

While gameplay features are described herein as the input to the state vector generation model, in some cases other inputs can be used in addition or instead of the gameplay features. For example, in some cases output modality capability information (e.g., information about what output modalities are available for use, and thus what state vectors are available for use) can be provided as an input to the state vector generation model so the state vector generation model can output the correct set of state vectors. As another example, in some cases some or all of the gameplay input data can be provided directly to the state vector generation model without features being first extracted. As used herein, the term output modality is intended to refer to a category of controllable state and/or controllable remote device. Output modalities can be defined in various degrees of abstraction. For example, a first output modality may refer to all controllable states associated with affecting light (e.g., the on/off state of a controllable light and the open/close state of controllable blinds) and a second output modality may refer to all controllable states associated with affecting air movement (e.g., the on/off state of a controllable fan and an appropriate state of a controllable thermostat). In another example, a first output modality may refer to all controllable lights (e.g., all remote devices that are controllable lights, which may not include other devices affecting light, such as blinds) and a second output modality may refer to all controllable thermostats (e.g., all remote devices that are controllable thermostats, which may not include other devices affecting temperature or airflow, such as fans). As used herein, the term output modality is intended to refer to outputs other than the primary outputs used to engage in the gameplay session. For example, for a user playing a console game via a television screen, the primary outputs may be the video being presented on the television screen, the audio being played through the television's speakers, and any audio or haptics being presented through the user's game controller. The state vector generation model can output a set of one or more state vectors, although often the set of state vectors includes at least a plurality of state vectors. Each of the state vectors can denote state information for how a particular remote device should be controlled. In other words, the state vector denotes the state into which the remote device should be placed or maintained. For example, for a fan (e.g., a smart switch controlling an overhead fan), the available states may be "on" and "off," and the state vector for that fan may thus indicate either "on" or "off." As another example, for a light source (e.g., a smart light bulb in a table lamp), the available states may include "on", "off", a dimming value (e.g., from 0-100 representing 0% to 100% brightness), and a color value (e.g., a number indicative of a color or a color temperature to be output by the light bulb), and the state vector for that light source may thus indicate i) "on" or "off", ii) a dimming value, iii) a color value, or iv) any combination of i-iii.

Once generated, the state vector(s) can be leveraged to control one or more remote devices in or near the environment. Remote devices are devices that can be controlled by another device via a wired or wireless connection (e.g., a wired network connection, such as a wired local area network, a direct wireless connection, such as Bluetooth, or the like). In some cases, remote devices can be controlled via direct control, local intermediary control, or off-site intermediary control. Direct control refers to sending a transmission to the device (e.g., via a direct connection like Bluetooth or via a local area network connection) that, when received by the device, causes the device to be controlled according to the transmission. Local intermediary control refers to sending a transmission to a local (e.g., via a local network or otherwise without the need for an Internet connection) intermediary device that will itself interpret the transmission and then control the remote device. An example of local intermediary control is a hub that controls a set of smart light bulbs in a house and acts as a bridge between the smart light bulbs and the local area network. Off-site intermediary control refers to sending a transmission to an off-site (e.g., not on a local network or via the Internet) intermediary device that will itself interpret the transmission and then control the remote device via an Internet connection. An example of Off-site intermediary control is a smart speaker that maintains an Internet connection with a cloud server so that the speaker can be controlled by interacting with an API hosted by the cloud server.

In some cases, state vectors can be generated locally (e.g., by a local gaming device). In some cases, only state vectors associated with known controllable states or known controllable remote devices are generated. In some cases, however, a set of state vectors can be generated without regard for the available controllable states or available controllable remote devices. For example, a large set of state vectors can be generated remotely (e.g., by a cloud server) and transmitted to a local device (e.g., local gaming device). The local gaming device may know of what controllable states or controllable remote devices are available, and then can analyze the received state vectors to determine that a first subset of the full set of state vectors can be utilized and a second subset of the full set of state vectors cannot be utilized, and are thus excluded. In an example, a user may only have controllable lights (e.g., a first output modality) and the local gaming device may receive state vectors for lights (e.g., a first output modality) and fans (e.g., a second output modality). In such an example, the local gaming device may exclude the state vectors for the fans and use the state vectors for the lights to control the controllable lights. In some cases, the excluded state vectors remain unused. In some cases, however, the excluded state vectors can be repurposed into additional state vectors for other output modalities (e.g., using fan state vectors to determine an additional set of state vectors for another type of remote device, such as lights or blinds).

In an example use case of certain aspects and features of the present disclosure, a user may be engaging in a role playing game that involves exploring different regions. When the user enters a desert region, the system may control the user's remote devices to turn up the heat in the room where the user is playing the game (e.g., in the gaming session's environment) and cause lights in that room to have a hotter color temperature, thus improving the user's immersion in the game's hot desert. As the user plays and moves into a cave in that same game, the system may control the user's remote devices to turn down the heat in the room, cause the lights in the room to dim and have a cooler temperature, and turn on a humidifier in the room, thus improving the user's immersion in the game's cold and damp cave.

In some cases, the system can control remote devices to improve the immersiveness of the user's gameplay experience. In some cases, the system can control remote devices to aid the user in playing the game, such as to guide the user to a particular goal or location (e.g., a hidden door in a wall may be indicated by a fan being turned on to blow air when the player character approaches that section of the wall containing the hidden door).

Certain aspects and features of the present disclosure improve the technical field of gaming, especially computer (e.g., personal computer, console, etc.) gaming, by generating a more immersive experience for the user while leveraging existing remote devices in the user's environment. Further, certain aspects and features of the present disclosure enable this improved immersive experience to occur very fast, and in some cases, with prediction and/or latency compensation, so as to improve the ability for the remote devices to be controlled quickly and accurately (e.g., accurately with respect to events occurring in the game).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a system 100 for gameplay synchronization, according to certain aspects of the present disclosure. The system 100 includes a gaming device 120 and one or more remote devices 122. The system 100 can include a synchronization processor 124, which can be a separate component or can be embodied in the gaming device 120 or one or more of the remote devices 122.

The gaming device 120 can be any suitable gaming device, such as a personal computer 102 (e.g., a desktop computer or laptop), a mobile device 112 (e.g., a smartphone), or a console device 110 (e.g., a portable console or stationary console). The gaming device 120 can be an active gaming device used by a user to play or otherwise actively participate in a game, or can be a passive gaming device used by a user to view another user playing a game.

A gaming device 120 can be embodied on a single piece of hardware (e.g., a portable console) or can be embodied on multiple pieces of hardware, whether co-located or not. For example, in some cases a gaming device 120 can include a cloud-based server that runs the game itself and is in communication with a local terminal (e.g., personal computer 102, mobile device 112, console device 110, or the like) that provides outputs to the user (e.g., video and audio via a monitor and speakers) and receives inputs from the user (e.g., button presses and the like).

The gaming device 120 can generate gameplay data that will be referred to herein as gameplay input data. This gameplay input data can be generated by and optionally output by the gaming device 120. A synchronization processor 124 can receive the gameplay input data and process it to generate one or more state vectors. When the synchronization processor 124 is embodied in the gaming device 120, the gaming device 120 may generate the gameplay input data for immediate reception by the synchronization processor 124. When the synchronization processor 124 is not embodied in the gaming device 120, the gaming device 120 can output the gameplay input data to be received by the synchronization processor 124.

The synchronization processor 124 can process the gameplay input data to generate one or more state vectors, which can then be used to control the one or more remote devices 122.

A set of example remote devices 122 is depicted in FIG. 1, although any number of and type of remote device 122 can be used. The examples shown in FIG. 1 include a lighting device 114, a fan 116, a set of blinds 118, a thermostat 106, a router 108, and a speaker 104. Each of the remote devices 122 can have one more controllable states. The controllable states of the lighting device 114 can include an on/off state (e.g., on or off), a dimming (e.g., brightness) state, a color state (e.g., a color or color temperature), and the like. The controllable states of the fan 116 can include an on/off state, a speed state (e.g., a speed setting), a rotation direction state (e.g., a direction of rotation setting), and the like. The controllable states of the blinds 118 can include an up/down state, a rotation state (e.g., degree of rotation of flat blinds, if available), and the like. The controllable states of the thermostat 106 can include an on/off state, a temperature state, a mode state (e.g., heating, cooling, heating, and cooling), a fan state (e.g., on/off state of the fan, speed of the fan, etc.), and the like. The controllable states of the router 108 can include an on/off state, a router setting (e.g., any controllable setting of the router, such as quality of service settings), and the like. The controllable states of the speaker 104 can include an on/off state, a volume state, a mute state, a sound source state (e.g., a source of sound to play, such as a network-accessible audio file), a sound data state (e.g., a collection of compressed or uncompressed data representative of a sound to be played by the speaker 104, such as Waveform Audio File (WAV) format data). Other remote devices and/or controllable states can be used.

The synchronization processor 124 can generate the one or more state vectors, which can then be received by the appropriate remote devices remote device 122 to be controlled according to the received state vector. In some cases, a state vector can be transmitted by the synchronization processor 124 directly to a remote device 122, although that need not always be the case. In some cases, the synchronization processor 124 can transmit the state vector to an intermediary device that can then effect control of the remote device 122.

Figure 2:
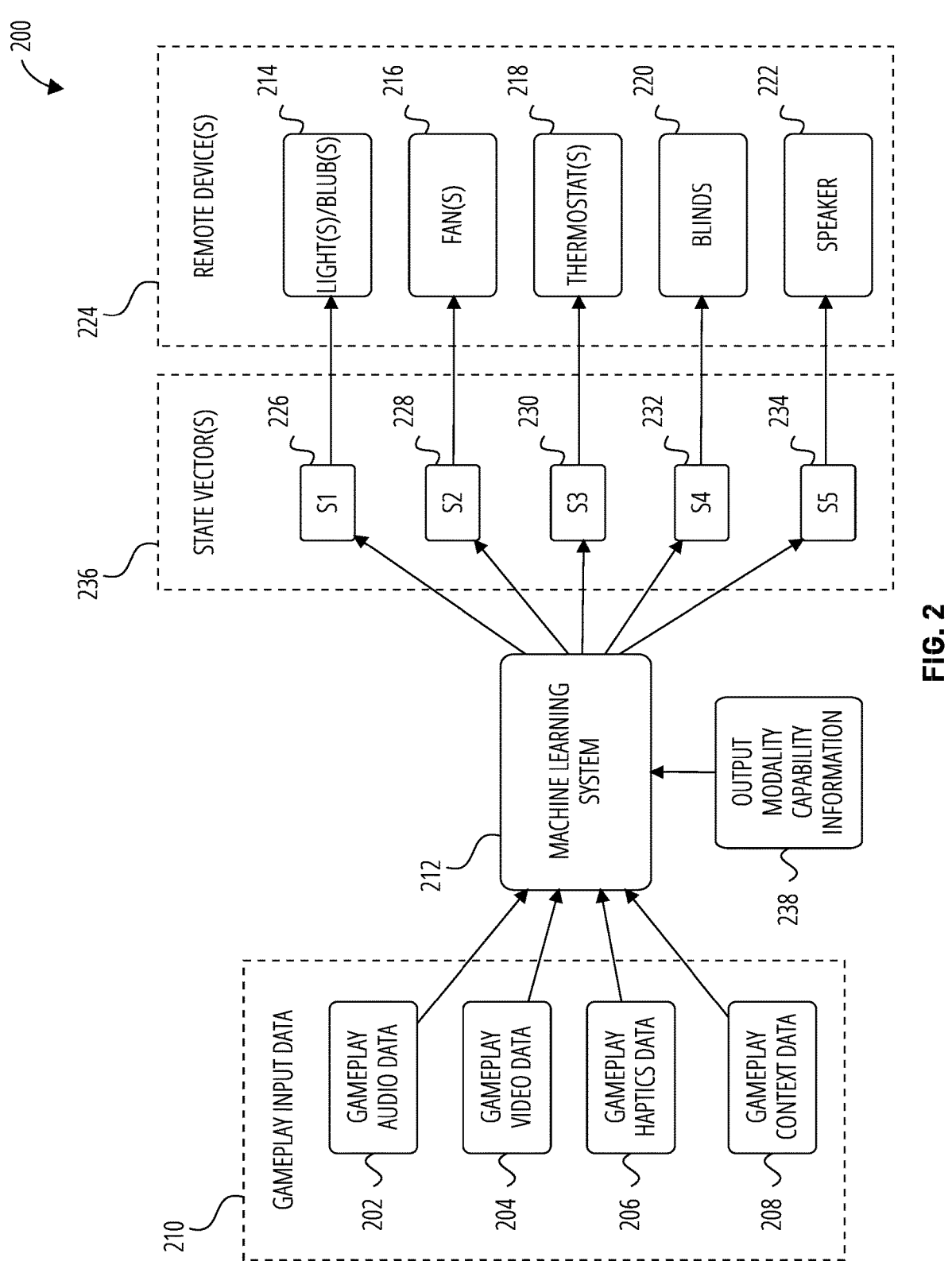
FIG. 2 is a schematic diagram of a gameplay synchronization system, according to certain aspects of the present disclosure.

FIG. 2 is a schematic diagram of a gameplay synchronization system 200, according to certain aspects of the present disclosure. The gameplay synchronization system 200 can include a machine learning system 212 that receives gameplay input data 210 and outputs one or more state vector(s) 236.

The gameplay input data 210 can originate from a gaming device (e.g., gaming device 120 of FIG. 1). The gameplay input data 210 can include one or more modalities of gameplay input data, referred to as "input modalities." The input modalities can include i) gameplay audio data 202; ii) gameplay video data 204; iii) gameplay haptics data 206; iv) gameplay context data 208; or v) any combination of i-iv.

The machine learning system 212 can receive the one or more modalities of gameplay input data 210 as inputs. In some cases, the machine learning system 212 can additionally receive output modality capability information 238 as an additional input. The output modality capability information 238 can be data indicative of the remote devices 224 and/or output modalities available to be controlled. The output modality capability information 238 can be sourced from the gaming device 120, although that need not always be the case. The output modality capability information 238 can be manually provided (e.g., via a user selecting what types of output modalities are available), automatically provided (e.g., via a network discovery process to automatically identify controllable remote devices 122), or a combination of manually and automatically provided.

Output modalities are categories of remote device that can be controlled. All remote devices sharing the same output modality can provide a similar type of output. For example, an audio output modality can be a category covering all remote devices capable of reproducing sound within the environment (e.g., remote-accessible speakers, digital personal assistants, and the like). Similarly, a lighting output modality can be a category covering all remote devices capable of effecting the lighting within the environment. In some cases, a remote device can fall into multiple output modalities, in which case different functions of the remote device may be categorized to different output modalities. Any suitable output modalities can be used, at any level of granularity (e.g., an overall lighting modality may itself be broken down into an artificial lighting modality and a natural lighting modality).

The machine learning system 212 can process its inputs to generate a set of one or more state vector(s) 236. Each of the one or more state vector(s) 236 can be directed to one or more of the remote devices 224. In some cases, each of the one or more state vector(s) 236 can be directed to one or more remote devices 224 of the same output modality. For example, a first state vector 226 can be associated with a lighting output modality and can be provided to a light/blub 214 to control the light/blub 214; a second state vector 228 can be associated with a fan output modality and can be provided to a fan 216 to control the fan 216; a third state vector 230 can be associated with a temperature output modality and can be provided to a thermostat 218 to control the thermostat 218; a fourth state vector 232 can be associated with a blinds output modality and can be provided to a set of blinds 220 to control the set of blinds 220; and a fifth state vector 234 can be associated with an audio output modality and can be provided to a speaker 222 to control the speaker 222.

Machine learning system 212 can be trained using training data. The training data can include training gameplay input data. Feedback (e.g., user feedback) can be provided based on the effects of the one or more state vector(s) 236 output from the machine learning system 212, which can be used in the training of the machine learning system 212. In some cases, a machine learning system 212 can be initially trained with one or more baseline models, which can then be further trained by a subset of users to perform better for those users. This further training can be iteratively performed on further subsets of the subset of users as needed. The subset of users can be any logical grouping of users, such as users sharing the same model of gaming device, users sharing similar remote devices 224 (e.g., the same devices or similar devices), users sharing similar output modalities, users sharing the same type of environment, users sharing the same environment and/or gaming device (e.g., multiple users in a household), and individual users. Thus, baseline models can be further trained to generate personalized models that are personalized to a subset of users (e.g., a grouping of users or a single user). In some cases, personalized models can be further personalized to generate second degree personalized models (e.g., an individual's personalized model that is based on a personalized model for a group of users, which is itself based on the baseline model). Second degree refers to the number of degrees removed from the baseline model. Any number of degrees can be used.

As described herein, in some cases the machine learning system 212 can receive as input the output modality capability information 238. In some cases, the machine learning system 212 can apply the output modality capability information 238 as an input to the machine learning model(s) being performed on the machine learning system 212, although that need not always be the case. In some cases, the output modality capability information 238 can be used by the machine learning system 212 to filter out and/or sort any state vector(s) 236 that were generated by the underlying machine learning model(s).

While five state vectors 236 and five remote devices 224 are depicted in FIG. 2, any number of state vectors and remote devices can be used, such as fewer or more than five.

Figure 3:
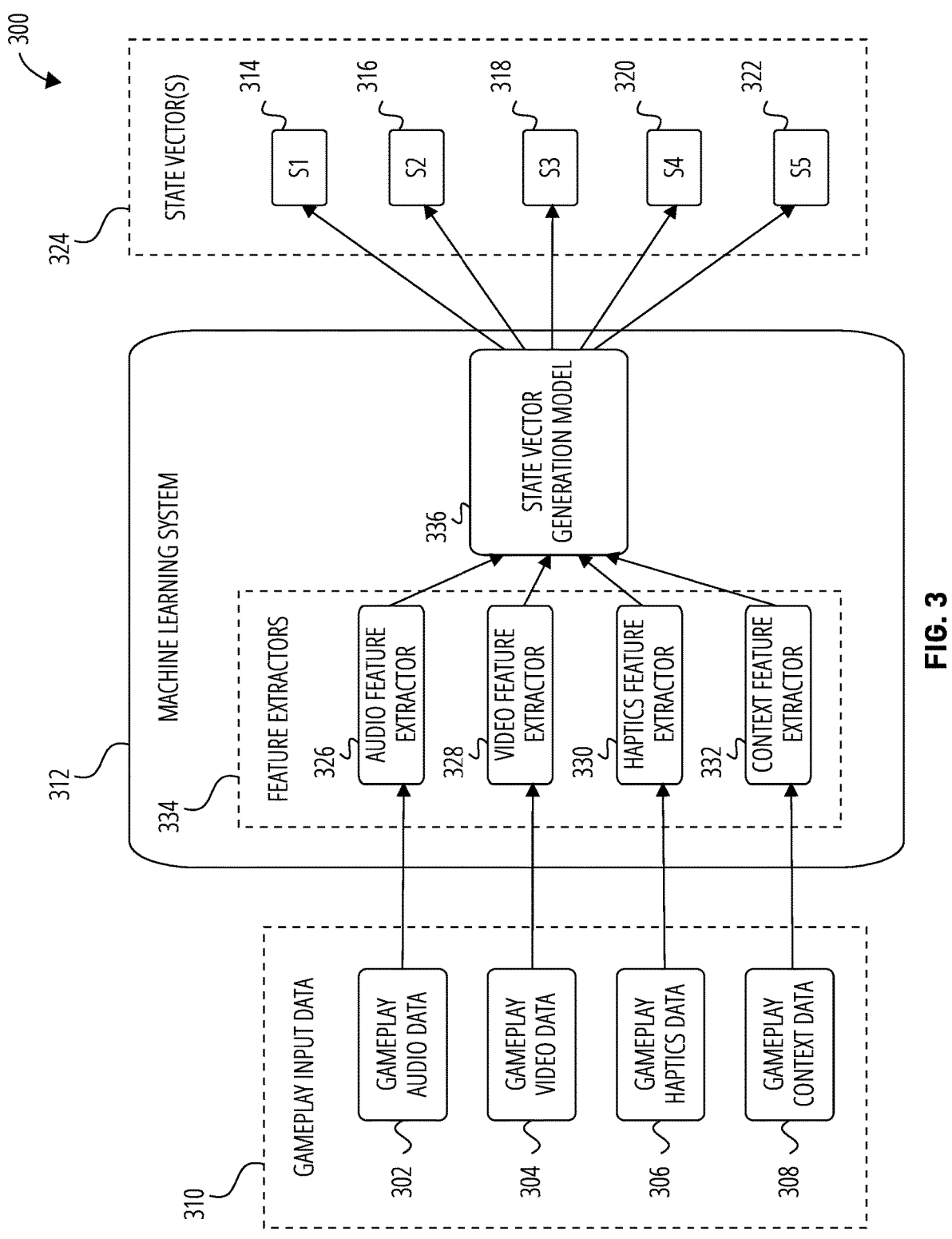
FIG. 3 is a schematic diagram of a machine learning system of a gameplay synchronization system, according to certain aspects of the present disclosure.

FIG. 3 is a schematic diagram of a machine learning system 312 of a gameplay synchronization system 300, according to certain aspects of the present disclosure. The gameplay input data 310, machine learning system 312, and state vector(s) 324 can be the same as or similar to gameplay input data 210, machine learning system 212, and state vector(s) 236 of FIG. 2, respectively.

The gameplay input data 310 can include one or more of gameplay audio data 302, gameplay video data 304, gameplay haptics data 306, and gameplay context data 308. The gameplay input data 310 can be provided to the machine learning system 312, which can then generate the one or more state vector(s) 236. First state vector 314, second state vector 316, third state vector 318, fourth state vector 320, and fifth state vector 322 can be the same as or similar to First state vector 226, second state vector 228, third state vector 230, fourth state vector 232, and fifth state vector 234 of FIG. 2, respectively.

As depicted in FIG. 2, the machine learning system 312 can be split into two parts, a set of feature extractors 334 and a state vector generation model 336. Thus, the machine learning system 312 can be split into a first model or set of models that are trained to understand the game's state (e.g., a current state or a predicted, future state), and a second model or set of models that are trained to generate state vectors from that understanding of the game's state.

In some cases, the set of feature extractors 334 includes a single feature extractor capable of extracting features from all of the gameplay input data 310 provided to it, however that need not always be the case. In some cases, the set of feature extractors 334 can include multiple feature extractors, each covering a unique input modality. In some cases, the set of feature extractors 334 includes a separate feature extractor for each of the input modalities of the gameplay input data 310.

For example, gameplay audio data 302 can be provided to an audio feature extractor 326 that has been trained on training gameplay audio data from a training dataset; gameplay video data 304 can be provided to a video feature extractor 328 that has been trained on training gameplay video data from a training dataset; gameplay haptics data 306 can be provided to a haptics feature extractor 330 that has been trained on training gameplay haptics data from a training dataset; and gameplay context data 308 can be provided to a context feature extractor 332 that has been trained on training gameplay context data from a training dataset. Each of the feature extractors 326, 328, 330, 332 can be trained to receive their respective inputs and output one or more features.

Each of the features output by the feature extractors 334 can be provided to the state vector generation model 336. The state vector generation model 336 can use the extracted features as an input and then generate the state vector(s) 324 as an output.

The state vector generation model 336 can be a probabilistic generative model that has been trained on training feature data, which may have been obtained via applying a training data set to the feature extractors 334. In some cases, the state vector generation model 336 can include a set of weighting values, which can be applied to the input features. In some cases, training as described herein can include adjusting the weighting values of the state vector generation model 336 to reach a more desirable set of state vector(s) 324.

In some cases, the state vector generation model 336 can be selected based on information about the user, the remote devices associated with the user's environment, and/or gaming devices associated with the user. For example, in some cases, the particular state vector generation model 336 used for a user having a first type of gaming device can be different than that of a user having a second type of gaming device. In some cases, the state vector generation model 336 can be selected based on information about the game being played by the user. For example, a first state vector generation model 336 may be used for a first game, but a second state vector generation model 336 may be used for a second game that is different from the first game.

FIG. 4 is a flowchart depicting a process 400 for synchronizing gameplay with remote devices, according to certain aspects of the present disclosure. Process 400 can be performed by any suitable hardware, such as a gaming device (e.g., gaming device 120 of FIG. 1), a remote device (e.g., remote device 122 of FIG. 1), a cloud-based server, or the like. In some cases, process 400 can be performed by a combination of suitable hardware (e.g., a combination of a gaming device and a cloud-based server).

At block 402, gameplay input data is received. Receiving gameplay input data can include receiving the gameplay input data from a gaming device. Receiving gameplay input data can include receiving multiple input modalities of gameplay input data. In some cases, receiving gameplay input data can include receiving any combination of one, two, three, or four of: i) gameplay audio data; ii) gameplay video data; iii) gameplay haptics data; and iv) gameplay context data.

The gameplay input data can be associated with a user engaging in a gameplay session. The user can be actively playing a game or the user can be passively watching another user play a game. The gameplay input data can be received in realtime or close to realtime as the gameplay session proceeds.

At block 404, gameplay features are extracted from the gameplay input data. The gameplay input data can be applied to a machine learning system to extract the gameplay features. In some cases, applying the gameplay input data to a machine learning system can include applying the gameplay input data to one or more feature extractors that have been trained to generate one or more gameplay features from the gameplay input data. In some cases, applying the gameplay input data to the one or more feature extractors can include applying different input modalities of the gameplay input data to respective feature extractors associated with (e.g., trained for) the given input modality, such as described in further detail with reference to gameplay synchronization system 300 of FIG. 3.

At block 406, at least one state vector can be generated based on the one or more gameplay features from block 404. Generating one or more state vectors can include applying one or more gameplay features to a state vector generation model. The state vector generation model can be trained to output appropriate state vectors given a set of gameplay features. Applying the one or more gameplay features to the state vector generation model can include applying a weighting value to each of the gameplay features. In some cases, the weighting value can be based on the gameplay feature, in which case each gameplay feature can be assigned its own weighting value. In some cases, however, the weighting value can be based on the input modality, and thus all gameplay features associated with the given input modality can be assigned the same weighting value.

In some cases, generating the at least one state vector at block 406 can be based at least in part on relative position information. Relative position information can be information indicative of a relative position of the user (or an expected location of the user, such as in front of the gaming device or in front of a display device) with respect to one or more remote devices. This relative position information can be leveraged to ensure certain effects are achieved in a desired location relative to the user. For example, if the game being played involves the player character exploring a dark cave and an opening to daylight is discovered to the player character's right side, the system can generate a state vector that can cause a light source located towards the right of the user to turn on or brighten.

At block 408, control of a remote device can be facilitated based on the generated state vector(s) from block 406. Facilitating control of a remote device can include generating a transmission, which, when received (e.g., received by a remote device or an intermediary device), can affect or effect a state change in the remote device.

For example, in some cases, facilitating control of a remote device at block 408 can include effecting a state change based on the generated state vector. Effecting the state change can include causing a remote device to change from an original state to the desired state indicated by the generated state vector.

In another example, in some cases, facilitating control of a remote device at block 408 can include preventing a state change (e.g., an unwanted state change) based on the generated state vector. Preventing a state change can include determining that the current estimated state of the remote device matches the state indicated by the generated state vector, then generating a transmission, which, when received (e.g., by the remote device or an intermediary device) prevents the remote device from changing state. For example, if a lighting device was set to turn on for 30 seconds 28 seconds ago, and if the system generates a state vector indicating that the lighting device should remain on (e.g., for a set amount of time or indefinitely), the system may generate a transmission that prevents the remote device from turning off after the 30 seconds have elapsed.

In some cases, facilitating control at block 408 can include generating and sending a control transmission based on the one or more state vectors from block 406. The control transmission can be sent to the remote device(s) and/or one or more intermediary devices. An intermediary device can receive a control transmission and either relay it or generate a new control transmission that can be sent to the remove device(s) and/or another one or more intermediary devices. In some cases, a remote device can act as an intermediary device for another remote device.

In some cases, facilitating control of one or more remote devices at block 408 can include interpreting the generated state vectors from block 406 in light of the available remote devices and/or available controllable states of the available remote devices. For example, in some cases the generated state vectors may include some unassignable state vectors that are not reproducible using or are not associated with any of the available remote devices, and thus cannot be assigned to any particular remote device. In such cases, facilitating control at block 408 can include analyzing the unassignable state vectors and either not using the unassignable state vectors or interpreting the unassignable state vectors to effect a different change in one of the available remote devices (e.g., if a state vector indicates a light is to be turned on, but not lights are available to be controlled, the system may actuate an available blinds control to open blinds to let light into the environment from outside). Such interpretation can be especially useful in cases where a full set of state vectors are generated on a server and transmitted to a local gaming device, which can then directly make use of a subset of the full set of state vectors, optionally interpreting the remaining unassignable state vectors to control available remote devices. In some case, however, generating the at least one state vector at block 406 can generate only those state vectors that are capable of being reproduced using and/or associated with the available devices. For example, a local gaming device and/or a remote server can receive a list of available controllable states and/or available remote devices, which it can then leverage to produce only those state vectors that can be reproduced using and/or associated with the available devices.

In some cases, facilitating control at block 408 can include receiving feedback associated with the remote device to determine whether or not control of the remote device was successful. For example, some remote devices may be capable of reporting their current state, which can be used by the system to determine if the current state matches the desired state set by the respective state vector. If the device's current state does not match, an additional attempt to control the remote device can be made. In some cases, feedback associated with the remote device can be obtained indirectly via another device. For example, to determine whether or not a lighting device was turned on as desired, a light sensor on a separate device (e.g., a gaming device or another remote device) can measure changes in ambient light in the environment, which can be used to determine if the lighting device turned on.

In some cases, at optional block 410, a gameplay experience quality score can be determined. The gameplay experience quality score can be a metric representative of the user's enjoyment and/or engagement with the game and/or gameplay session. In some cases, the gameplay experience quality score can include an objective component that is determined objectively, such as by measuring information about the user's engagement with the gaming device. In some cases, the gameplay experience quality score can include a subjective component that is derived from user feedback. For example, a user can provide user feedback (e.g., in response to a prompt or survey after completing a game session, or otherwise) that can be used to determine the gameplay experience quality score. The user feedback can be directly related to the control of the remote devices (e.g., an answer to a question asking if the lighting effects created by the remote devices improved the gameplay experience) or can be indirectly related to the control of the remote devices (e.g., an answer to a question about raking the gameplay session's immersiveness may indirectly indicate whether or not control of the remote devices improved the user's immersion into the game).

At optional block 412, the gameplay experience quality score can be leveraged to update the machine learning system. Updating the machine learning system can include updating one or more feature extractors and/or updating the state vector generation model. In some cases, updating the machine learning system can include adjusting one or more weighting values of the state vector generation model. The machine learning system can be updated (e.g., via updating weighting values of the state vector generation model) to maximize the gameplay experience quality score.

While certain blocks are depicted with respect to process 400, in some cases process 400 can include additional blocks, fewer blocks, or different blocks in different orders. For example, in some cases, before receiving gameplay input data at block 402, process 400 can include determining available remote devices and/or determining available changeable states associated with one or more remote devices. In such cases, generating the at least one state vector at block 406 can be based at least in part on the determined available remote devices and/or determined available changeable states. For example, if no controllable lights are identified, the state vector generation model may not generate any state vectors associated with lighting controls. In another example, process 400 can include only blocks 402, 404, 406, and 408, without blocks 410 and 412.

Figure 5:
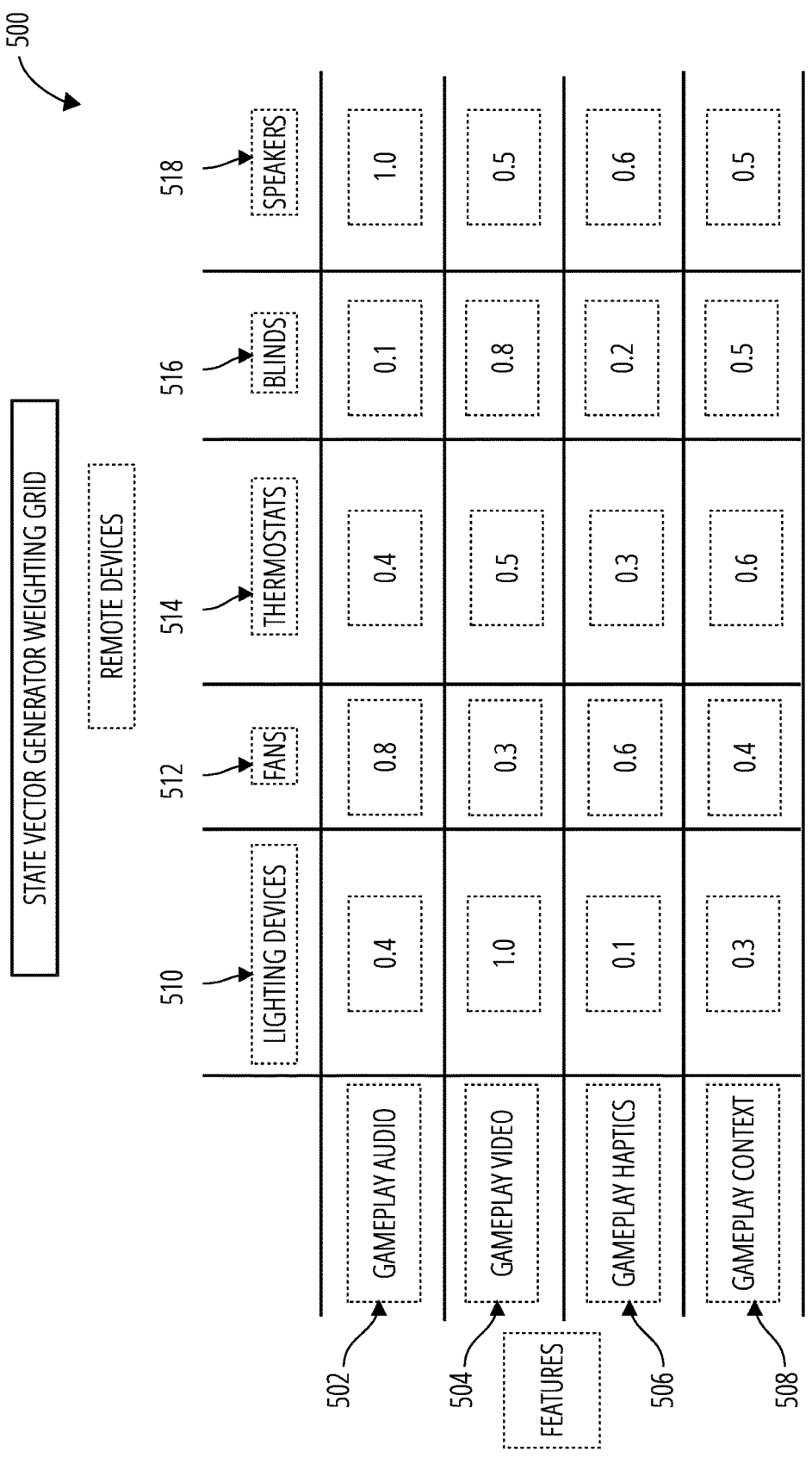
FIG. 5 is a diagram of a state vector generator weighting grid, according to certain aspects of the present disclosure.

FIG. 5 is a diagram of a state vector generator weighting grid 500, according to certain aspects of the present disclosure. The state vector generator weighting grid 500 of FIG. 5 is an example visualization of some underlying weightings used by the state vector generation model. The state vector generator weighting grid 500 of FIG. 5 is an example provided for illustrative purposes. In some cases, other weighting values may be used, other categories and mappings of weighting values may be used, or other techniques may be used to apply weightings other than those visualizable by a state vector generator weighting grid 500.

The left side of the state vector generator weighting grid 500 depicts groupings of features as produced by the one or more feature extractors. For example, these groupings can include gameplay audio features 502, gameplay video features 504, gameplay haptics features 506, and gameplay context features 508. While the groupings depicted in FIG. 5 are based on input modalities, that need not always be the case, and in some cases features are not grouped together at all, but are separate. The top side of the state vector generator weighting grid 500 depicts groupings of remote devices, such as lighting devices 510, fans 512, thermostats 514, blinds 516, and speakers 518. While these groupings depicted in FIG. 5 are based on device types or output modalities, that need not always be the case, and in some cases remote devices are not grouped together at all, but are separate.

As depicted in FIG. 5, each combination of feature groupings and remote device groupings has a weighting value. When determining state vectors for the different remote device groupings (e.g., determining a state vector for a fan), the different feature groupings can be given different weightings. For example, when determining state vectors for lighting devices 510, groupings such as gameplay audio 502, gameplay haptics 506, and gameplay context 508 may have relatively low weighting values, but gameplay video 504 may have a relatively high weighting value since the visuals of the game are most likely to be more important to the control of lighting devices 510 to achieve the desired effects (e.g., improved gameplay immersion). Likewise, gameplay audio 502 may have a relatively high weighting value compared to the other groupings for generating state vectors for speakers 518.

In some cases, techniques other than weighting values can be used to generate state vectors from gameplay input data.

Figure 6:
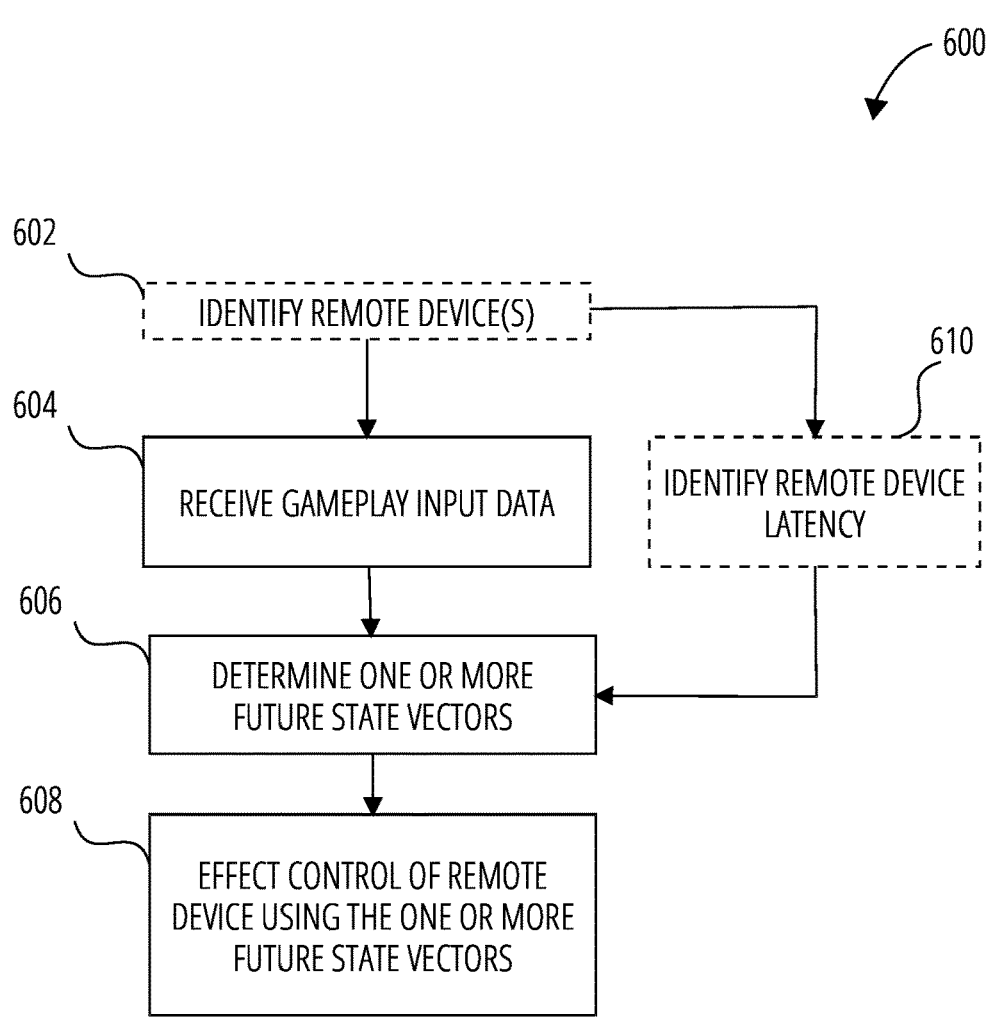
FIG. 6 is a flowchart depicting a process for determining future state vectors, according to certain aspects of the present disclosure.

FIG. 6 is a flowchart depicting a process 600 for determining future state vectors, according to certain aspects of the present disclosure. Process 600 can be performed by any suitable hardware, such as a gaming device (e.g., gaming device 120 of FIG. 1), a remote device (e.g., remote device

122 of FIG. 1), a cloud-based server, or the like. In some cases, process 600 can be performed by a combination of suitable hardware (e.g., a combination of a gaming device and a cloud-based server).

In some optional cases, one or more available remote devices can be identified at block 602. Identifying available remote devices can include receiving device information from a user (e.g., the user providing a list of remote devices or programming the remote device into the system), automatically detecting available remote devices (e.g., via a universal plug and play protocol), or otherwise identifying the remote devices. In some cases, identifying one or more remote devices at block 602 can include identifying one or more controllable states associated with the one or more remote devices.

At block 604, gameplay input data can be received. Receiving gameplay input data at block 604 can be the same as receiving gameplay input data at block 402.

At block 606, one or more future state vectors can be determined. Determining a future state vector can include determining a state vector for a time in the future. In some cases, determining one or more future state vectors can include generating the one or more state vectors from predicted information. In an example, the system can use the received gameplay input data from block 604 to generate predicted gameplay input data (e.g., gameplay input data for x seconds in the future) that can be used to generate the future state vector(s) similar to how gameplay input data is used to generate state vectors in process 400 of FIG. 4. In such cases, the use of predicted gameplay input data allows the future state vectors to be generated for a time in the future (e.g., x seconds into the future). In another example, gameplay input data can be processed by the one or more feature extractors to produce predicted gameplay features associated with a time in the future (e.g., x seconds in the future). These predicted gameplay features can then be used to generate the future state vector(s) similar to how gameplay features are used to generate state vectors in process 400 of FIG. 4. In such cases, the use of predicted gameplay features allows the future state vectors to be generated for a time in the future (e.g., x seconds into the future). In yet another example, gameplay input data and gameplay features can be provided to a state vector generation model that is trained to generate predicted state vectors for some time in the future (e.g., x seconds in the future).

Regardless of how the one or more future state vectors are generated, the one or more future state vectors can be used at block 608 to effect control of one or more remote devices.

In some cases, the use of one or more future state vectors to control one or more remote devices can be used to overcome device latency. For example, in some cases, at optional block 610, latency can be identified for a remote device. In some optional cases, the device latency can be identified as part of or following identification of the available remote device(s) at block 602. Identifying latency can be based on user feedback (e.g., a user entering in a latency value or interacting with the system to indicate when a change in state for the remote device is detected by the user after being initiated by the system), can be automatic (e.g., based on measured latency values, such as via network communications), or otherwise. Determining the one or more future state vectors at block 606 can include using the identified latency value from block 610 such that the state vector for the given remote device is determined n milliseconds in the future, where n is or is based on the latency value for the given remote device. Thus, when the future state vector is used to effect control of the remote device at block 608, the latency inherent in the remote device is accounted for and the effect of the remote device's state change is discerned at the desired time. For example, a fan may have a relatively large latency value due to i) the time it takes for network communications to be received by the fan controller, ii) the time it takes for the fan controller to turn on the fan, iii) the time it takes for the fan to spin up to speed, iv) the time it takes for the air movement from the fan to be felt by the user, or v) any combination of i-iv. The system can determine a future state vector for this particular remote device that is n milliseconds in the future, where n is the fan's latency value in milliseconds. Thus, if the fan's latency is 3 seconds, and if a user is playing a game and it is predicted that in 3 seconds the user's player character may enter a windy region in the video game, the system can determine that the future state vector for the fan 3 seconds from now should be "on" and can effect control of the remote device now using that future state vector such that in 3 seconds, the fan's effect will be felt by the user as the player character enters the windy region. In some cases, if gameplay actions indicate that a particular future state vector is no longer valid, a control can be effected to rescind or nullify the previously acted upon state vector. In the example with the fan, if the user takes action to stop the play character from entering the windy region, the system can automatically effect control of the remote device to turn the fan off, thus reducing or minimizing any undesired effects.

In some cases, the use of one or more future state vectors can be leveraged for purposes other than compensating for latency values. For example, predicting future state vectors can be used to inform current state vectors. In such an example, if a lighting device previously had a state vector of "off" and is to have a state vector of "on" now, if a predicted future state vector indicates that the lighting device should have an even brighter intensity than now, the current state vector can be set to "on" and "50%" while the future state vector can be set to "on" and "100%." If no future state vector existed or if the future state vector merely had the lighting device remain the same or turn off, the current state vector may have been set to "on" and "100%."

In some cases, prediction of gameplay input data, gameplay features, and/or state vectors can be performed on remote server(s) to alleviate computing power use by the gaming device.

While certain blocks are depicted with respect to process 600, in some cases process 600 can include additional blocks, fewer blocks, or different blocks in different orders. For example, in some cases, process 600 includes only block 604, 606, and 608, without blocks 602 or 604.

Figure 7:
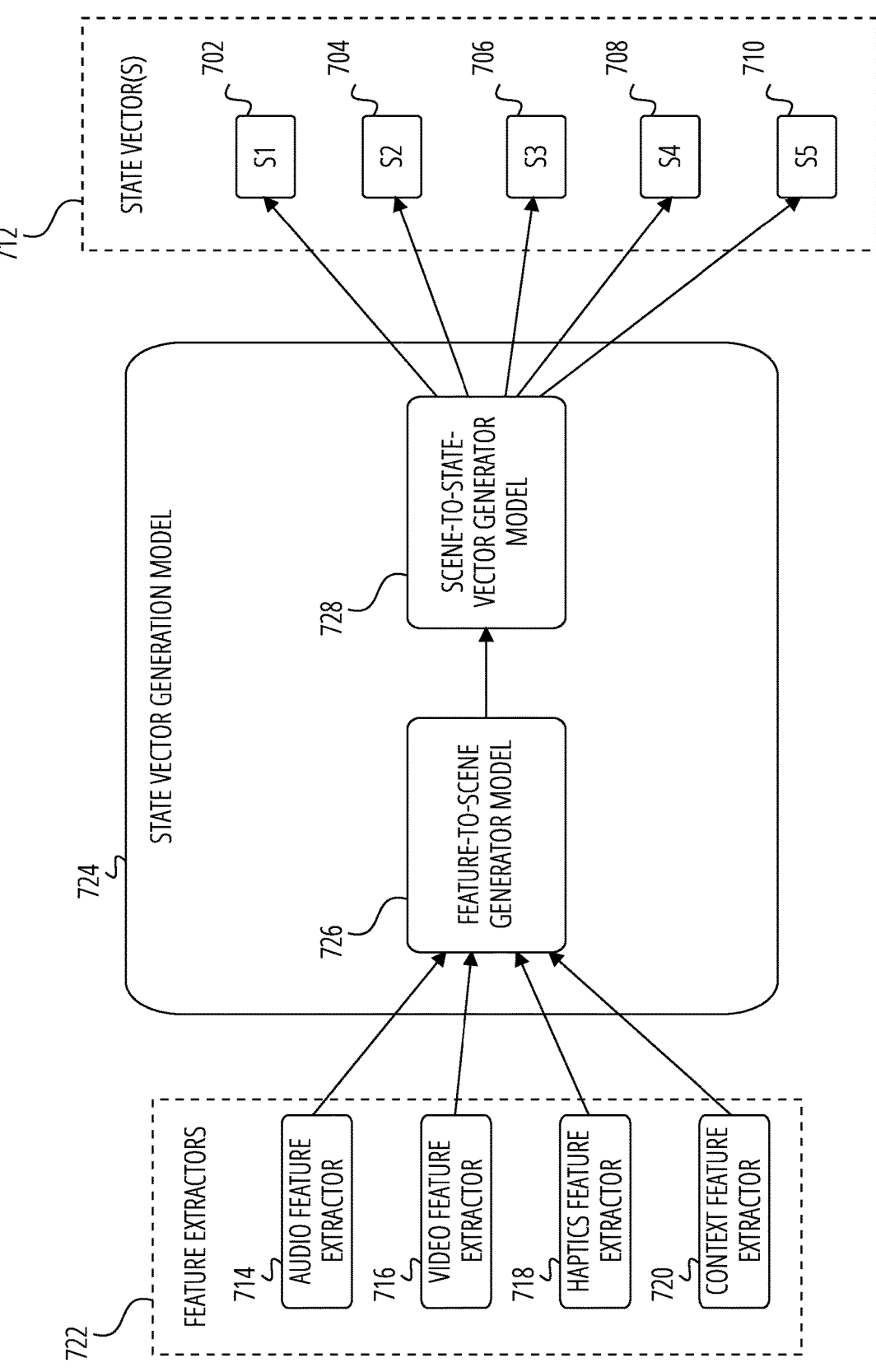
FIG. 7 is a schematic diagram of a state vector generation model of a gameplay synchronization system, according to certain aspects of the present disclosure.

FIG. 7 is a schematic diagram of a state vector generation model 724 of a gameplay synchronization system, according to certain aspects of the present disclosure. State vector generation model 724 can be state vector generation model 336 of FIG. 3. The system can include one or more feature extractors 722, such as an audio feature extractor 714, a video feature extractor 716, a haptics feature extractor 718, and a context feature extractor 720. The state vector generation model 724 can generate one or more state vector(s) 712, such as s first state vector 702, a second state vector 704, a third state vector 706, a fourth state vector 708, and a fifth state vector 710.

The one or more feature extractors 722 can output gameplay features to a feature-to-scene generator model 726. The feature-to-scene generator model 726 can output scene data to a scene-to-state-vector generator model 728, which can then output the one or more state vector(s) 712. The feature-to-scene generator model 726 can generate scene data from the gameplay features. The scene data can be indicative of the type of output effects that are desired to be created by any available remote devices. For example, the scene data may indicate that lighting should be dim, temperature should be slightly lowered, and dripping noises should be presented behind the user. In some cases the feature-to-scene generator model 726 is pre-trained to output scene data. In some cases, the feature-to-scene generator model 726 can be based at least in part on the available remote devices, although that need not always be the case.

The scene-to-state-vector generator model 728 can take the scene data as input and output state vectors. In some cases, the scene-to-state-vector generator model 728 can take any scene data and output state vectors based on the available remote devices. In the above example, if the available remote devices include lighting devices, a thermostat, and a speaker, the scene-to-state-vector generator model 728 may take the scene data and generate state vectors to turn the lighting devices down or off, turn the thermostat to a lower temperature, and play a dripping sound effect from the speaker. If, however, the available remote devices only include lighting devices and a fan, the scene-to-state-vector generator model 728 may take the same scene data and generate state vectors to turn the lighting devices down or off and to turn the fan on to simulate a decrease in temperature, and not generate state vectors for the dripping sound effect.

In some cases, the feature-to-scene generator model 726 can be implemented on a remote server, whereas the scene-to-state-vector generator model 728 can be implemented on a local gaming device, although that need not always be the case.

Figure 8:
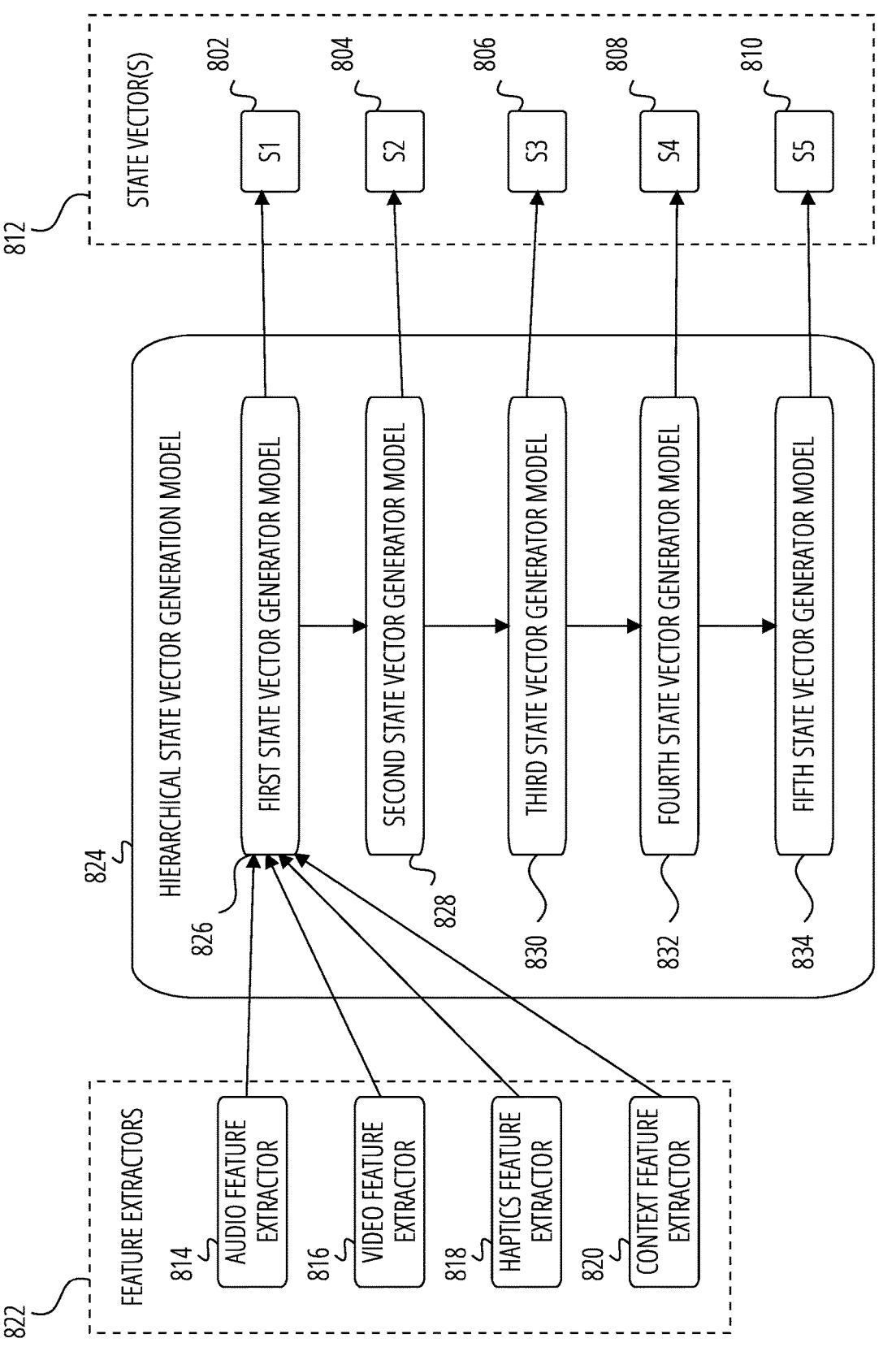
FIG. 8 is a schematic diagram of a hierarchical state vector generation model of a gameplay synchronization system, according to certain aspects of the present disclosure.

FIG. 8 is a schematic diagram of a hierarchical state vector generation model of a gameplay synchronization system, according to certain aspects of the present disclosure. hierarchical state vector generation model 824 can be state vector generation model 336 of FIG. 3. The system can include one or more feature extractors 822, such as an audio feature extractor 814, a video feature extractor 816, a haptics feature extractor 818, and a context feature extractor 820. The hierarchical state vector generation model 824 can generate one or more state vector(s) 812, such as s first state vector 802, a second state vector 804, a third state vector 806, a fourth state vector 808, and a fifth state vector 810.

The hierarchical state vector generation model 824 can itself be made up of a series of hierarchical models. The gameplay features can be provided as input to the first state vector generator model 826, which can output the first state vector 802 and first supplemental data. The first supplemental data can be provided to the second state vector generator model 828, which can output the second state vector 804 and second supplemental data. The second supplemental data can be provided to the third state vector generator model 830, which can output the third state vector 806 and third supplemental data. The third supplemental data can be provided to the fourth state vector generator model 832, which can output the fourth state vector 808 and fourth supplemental data. The fourth supplemental data can be provided to the fifth state vector generator model 834, which can output the fifth state vector 810. Any number of hierarchical models (or levels) can be used to makeup the hierarchical state vector generation model 824.

When a hierarchical state vector generation model 824 is used, the generation of a particular state vector can affect the generation of subsequent state vectors. For example, if the first state vector generator model 826 outputs a particular state vector that is generated to achieve a particular lighting effect, the subsequent state vector generator models may not need to generate any state vectors to achieve that particular lighting effect since it has already been addressed. However, if the first state vector generator model 826 outputs a particular state vector that is generated to achieve a different lighting effect, a subsequent state vector generation model may generate a state vector to achieve the particular lighting effect that had not already been addressed by a prior state vector generation model. The use of hierarchical state vector generation models 824 can have other benefits.

Figure 9:
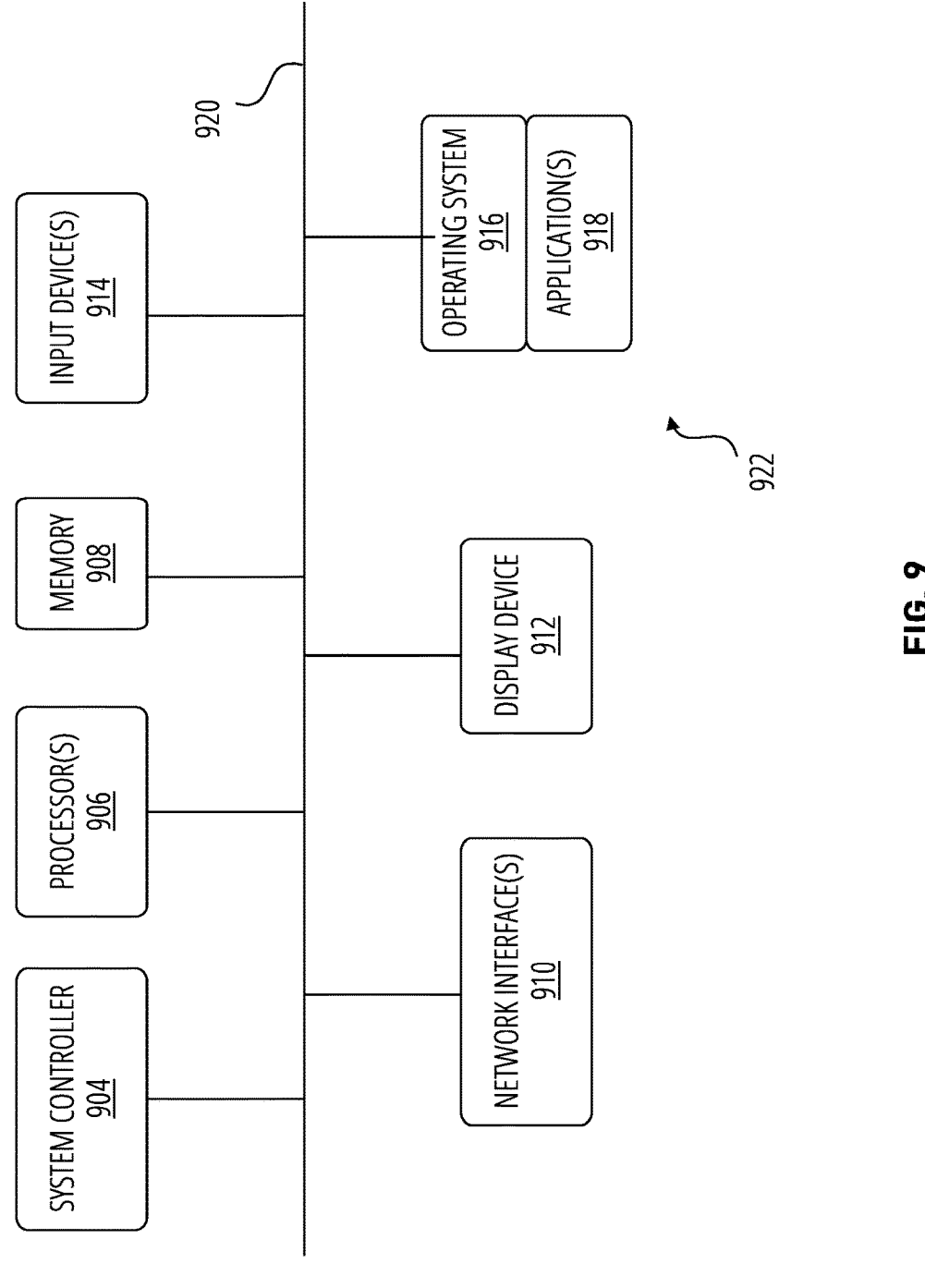
FIG. 9 is a block diagram of an example system architecture for implementing features and processes of the present disclosure.

FIG. 9 is a block diagram of an example system architecture 902 for implementing features and processes of the present disclosure, such as those presented with reference to processes 400, 600 of FIG. 4 and FIG. 6, respectively. The features and processes disclosed herein can be implemented using one or multiple instances of 902. The system architecture 902 can be used to implement a server (e.g., a cloud-accessible server), a user device (e.g., a smartphone or personal computer), or any other suitable device for performing some or all of the aspects of the present disclosure. The system architecture 902 can be implemented on any electronic device that runs software applications derived from compiled instructions, including without limitation personal computers, servers, smart phones, electronic tablets, game consoles, email devices, and the like. In some implementations, the system architecture 902 can include one or more processors 906, one or more input devices 914, one or more display devices 912, one or more network interfaces 910, and one or more computer-readable media 922. Each of these components can be coupled by bus 920.

Display device 912 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 914 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 920 can be any known internal or external bus technology, including but not limited to Industry Standard Architecture (ISA), Extended ISA (EISA), Peripheral Component Interconnect (PCI), PCI Express, NuBus, Universal Serial Bus (USB), Serial Advanced Technology Attachment (ATA), or FireWire.

Computer-readable medium 922 can be any medium that participates in providing instructions to processor 906 for execution, including without limitation, non-volatile storage media (e.g., optical disks, magnetic disks, flash drives, etc.) or volatile media (e.g., synchronous dynamic random access memory (SDRAM), read only memory (ROM), etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 922 can include various instructions for implementing operating system 916 and applications 918 such as computer programs. The operating system 916 can be multi-user, multiprocessing, multitasking, multithreading, real-time and the like. The operating system 916 performs basic tasks, including but not limited to: recognizing input from input device 914; sending output to display device 912; keeping track of files and directories on computer-readable medium 922; controlling peripheral devices (e.g., storage drives, interface devices, etc.) which can be controlled directly or through an I/O controller; and managing traffic on bus 920. Computer-readable medium 922 can include various instructions for implementing firmware processes, such as a basic input output system (BIOS). Computer-readable medium 922 can include various instructions for implementing any of the processes described herein, including at least processes 400, 600 of FIG. 4 and FIG. 6, respectively.

Memory 908 can include high-speed random access memory and/or non-volatile memory, such as one or more magnetic disk storage devices, one or more optical storage devices, and/or flash memory (e.g., NAND, NOR). The memory 908 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 908 can store an operating system, such as Darwin, RTXC, LINUX, UNIX, OS X, WINDOWS, or an embedded operating system such as VxWorks.

System controller 904 can be a service processor that operates independently of processor 906. In some implementations, system controller 904 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters, and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

One or more elements or aspects or steps, or any portion(s) thereof, from one or more of any of the claims below can be combined with one or more elements or aspects or steps, or any portion(s) thereof, from one or more of any other of the claims below or combinations thereof, to form one or more additional implementations and/or claims of the present disclosure.

What is claimed is:

1. A computer-implemented method comprising:
   receiving gameplay input data associated with a first electronic device engaging in a virtual gameplay session;
   identifying one or more gameplay features from the gameplay input data;
   determining, for a remote device in a physical environment that includes the first electronic device, a latency value;
   generating, based at least in part on the one or more gameplay features, a state change instruction to change a physical state for a remote device, wherein the state change instruction compensate for corresponding latency, based at least in part on the latency value, when facilitating the change of the physical state; and
   causing, based at least in part on the state change instruction, the remote device to change from a first physical state to a second physical state.

2. The computer-implemented method of claim 1, wherein the gameplay input data includes: i) gameplay audio data; ii) gameplay video data; iii) gameplay haptics data; iv) gameplay context data; or v) any combination of i-iv.

3. The computer-implemented method of claim 1, wherein identifying the one or more gameplay features includes applying the gameplay input data to one or more machine learning models trained according to a unique input modality.

4. The computer-implemented method of claim 3, wherein:
   the gameplay input data includes a plurality of gameplay data streams;
   each game play data stream of the plurality of gameplay data streams is associated with a different input modality of a plurality of input modalities;
   the one or more machine learning models being a plurality of machine learning models;
   each machine learning model of the plurality of machine learning models being associated with the different input modality; and
   identifying the one or more gameplay features from the gameplay input data includes applying each gameplay data stream to a respective machine learning model of the machine learning models according to a respective input modality of the plurality of input modalities that corresponds with each gameplay data stream.

5. The computer-implemented method of claim 1, wherein generating the state change instruction includes applying the one or more gameplay features to a physical state control model that controls the physical state of the remote device.

6. The computer-implemented method of claim 5, wherein the physical state control model is a probabilistic generative model.

7. The computer-implemented method of claim 5, wherein:
   applying the one or more gameplay features to the physical state control model includes applying a weighting value for each of the one or more gameplay features to generate one or more weighted gameplay features; and
   the computer-implemented method further comprises determining one or more state change instructions based at least in part on the one or more weighted gameplay features.

8. The computer-implemented method of claim 7, further comprising:
   determining a gameplay experience quality score associated with the virtual gameplay session; and
   adjusting the weighting value, based at least in part on the gameplay experience quality score, to improve the gameplay experience quality score.

9. The computer-implemented method of claim 8, wherein determining the gameplay experience quality score includes:
   receiving user feedback associated with the virtual gameplay session; and
   processing the user feedback to determine the gameplay experience quality score.

10. The computer-implemented method of claim 5, wherein the physical state control model is pretrained according to a baseline model and the method further comprises:
    receiving user feedback associated with the virtual gameplay session; and
    updating the physical state control model based at least in part on the user feedback.

11. The computer-implemented method of claim 1, wherein the remote device is one remote device of a plurality of remote devices and the state change instruction is one of a plurality of state change instructions, and
    the computer-implemented method further comprises determining a set of changeable states associated with the plurality of remote devices, wherein generating the plurality of state change instructions include generating, for each changeable state of the set of changeable states, a corresponding state change instruction of the plurality of state change instructions.

12. The computer-implemented method of claim 1, wherein causing the change from the first physical state includes transmitting a command signal via a wired connection or a wireless connection to change the first physical state of the remote device to the second physical state.

13. The computer-implemented method of claim 1, wherein:
    wherein the remote device is one remote device of a plurality of remote devices, the state change instruction is one state change instruction of a plurality of state change instructions, and the latency value is one latency value of a plurality of latency values; and identifying the one or more gameplay features from the gameplay input data includes predicting values for at least one gameplay feature of the one or more gameplay features up to a future time equal to a current time plus a largest latency value of the plurality of latency values, wherein generating the state change instruction is based at least in part on the plurality of latency values such that, for a given remote device of the plurality of remote devices, a respective generated state change instruction accounts for a respective latency value of the plurality of latency values.

14. The computer-implemented method of claim 1, wherein:
  generating the state change instruction occurs on a server that is communicatively coupled to a gaming device being used by a user to engage in the virtual gameplay session; and
  causing the change from the first physical state includes transmitting the state change instruction to the gaming device.

15. The computer-implemented method of claim 14, wherein causing the change to the second physical state includes transmitting, from the gaming device, a command signal, via a wired connection or a wireless connection, to change the first physical state of the remote device to the second physical state.

16. The computer-implemented method of claim 14, wherein:
  the state change instruction is one state change instruction of a plurality of state change instructions corresponding to a plurality of available physical state changes of the physical environment; and
  the plurality of state change instructions, when received by the gaming device, are processed to exclude each state change instruction of the plurality of state change instructions associated with a first available physical state changes of the plurality of available physical state changes.

17. The computer-implemented method of claim 1, further comprising receiving output modality capability information indicative of a plurality of available physical state changes of the physical environment, wherein generating the state change instruction is based at least in part on the output modality capability information such that the state change instruction is associated with one available physical state change of the plurality of available physical state changes.

18. The computer-implemented method of claim 1, further comprising receiving gameplay output state data associated with the first electronic device engaging in the virtual gameplay session, wherein:
  the gameplay output state data is:
    indicative of one or more desired physical states associated with one or more available physical state change of a plurality of available physical state changes; and
    associated with the virtual gameplay session; and
  causing the change from the first physical state to the second physical state is further based at least in part on the gameplay output state data.

19. The computer-implemented method of claim 1, further comprising determining position information of the remote device relative to an expected location of the first electronic device, wherein generating the state change instruction is further based at least in part on the position information.

20. The computer-implemented method of claim 1, wherein the remote device can be one of: i) a light source;

ii) a fan; iii) a thermostat; iv) a window blinds controller; v) a speaker, the speaker not directly outputting gameplay audio data; vi) a switch; or vii) a dimmer.

21. The computer-implemented method of claim 1, wherein causing the change from the first physical state includes employing an application programming interface associated with the remote device.

22. The computer-implemented method of claim 1, wherein the physical environment includes a second electronic device outputting a display of the virtual gameplay session and a third electronic device outputting audio of the virtual gameplay.

23. A system comprising:
  a memory having stored thereon computer-executable instructions; and
  a control system including one or more processors configured to access the memory and execute the computer-executable instructions to perform operations comprising:
    receiving gameplay input data associated with a first electronic device engaging in a virtual gameplay session;
    identifying one or more gameplay features from the gameplay input data;
    receiving output modality capability information indicative of a plurality of available physical state changes of a physical environment that includes the first electronic device;
    generating, based at least in part on the one or more gameplay features and the output modality capability information, a state change instruction to change an available physical state change of the plurality of available physical state changes for a remote device in the physical environment; and
    causing, based at least in part on the state change instruction, the remote device to change from a first physical state to a second physical state.

24. One or more non-transitory computer readable media comprising computer-executable instructions that, when executed by one or more processors of an electronic device, cause the electronic device perform operations comprising:
    receiving gameplay input data associated with a first electronic device engaging in a virtual gameplay session;
    identifying one or more gameplay features from the gameplay input data;
    determining position information of a remote device, relative to an expected location of the first electronic device, in a physical environment that includes the first electronic device;
    generating, based at least in part on the one or more gameplay features and the position information, a state change instruction to change a physical state for the remote device; and
    causing, based at least in part on the state change instruction, the remote device to change from a first physical state to a second physical state.

25. The or more non-transitory computer-readable media of claim 24, further comprising additional computer-executable instructions that, when executed by the one or more processors, cause the electronic device to perform additional operations comprising determining, for the remote device, a latency value, wherein generating the state change instruction is further based at least in part on the latency value such that corresponding latency is compensated for when facilitating the change of the physical state the remote device.

* * * * *